United States Patent Office 3,520,152
Patented July 14, 1970

3,520,152
SYNCHRONOUS UNIVERSAL COUPLING
Leopold Schmid, 49 Pischekstrasse,
7 Stuttgart, Germany
Filed Oct. 23, 1968, Ser. No. 770,026
Claims priority, application Germany, Nov. 20, 1967,
1,628,812
Int. Cl. F16d 3/30
U.S. Cl. 64—21　　　　　　　　　　　　　10 Claims

ABSTRACT OF THE DISCLOSURE

A synchronous universal coupling having grooves in an outer coupling member, and in an inner coupling member which, for torque transmission, are engaged by anti-friction bodies guided by a cage, which in turn is guided by means of curved control grooves, in which other anti-friction bodies are received as control elements, the torque-transmitting anti-friction bodies being of roller-like shape and provided with a bore for receiving the cage-controlling anti-friction bodies.

BRIEF SUMMARY OF THE INVENTION

This invention relates to a synchronous universal coupling with grooves in an outer and an inner coupling member, which are engaged with anti-friction elements which transmit torque beween the coupling members and which are guidably supported by a cage controlled by other anti-friction elements traveling in curved control grooves in said coupling members.

In one known synchronous universal coupling of this kind, the torque-transmitting anti-friction elements, controlled by the cage, are in the shape of balls, and the curved control grooves for guiding the cage, are located between said balls when viewed along the circumference. The other anti-friction elements serving as control elements and arranged between the curved guide ridges, are also balls. This well-known embodiment suffers from the disadvantage common to all synchronous universal couplings using balls for torque transmission, namely, the balls, for all practical purposes, make only point-to-point contact with the grooves in the outer and inner coupling members, and the high specific pressure generated allows transmission of only very limited torque. This is particularly true for devices of the type just described, in which only half the balls are being used for actual torque transmission.

In another known embodiment of synchronous universal couplings of the above kind, roller-shaped anti-friction bodies are used for the torque transmission. This known synchronous universal coupling consists if an inner coupling member having a spherical outer surface and an outer coupling member surrounding the inner member in the manner of a socket. Transmission of torque is effected by a multitude of mutually aligned notches which extend straight and parallel to the axis of the inside of the outer coupling member, whereas the opposite notches and lands of the inner coupling member are curved around the center of the coupling. The roller-shaped anti-friction bodies, whose axes of rotation are arranged essentially at a right angle to the center of the coupling, are provided with a bore in which a bolt-shaped control element with three spherical bulges is received. The outer spherical bulge engages a bore in the outer coupling member, the inner spherical bulge engages a bore in the inner coupling member, and the central bulge is centered in the bore of the roller-shaped anti-friction body.

This coupling configuration has the disadvantage that the bolt-shaped control elements which, necessarily, must possess a certain length, are in radial arrangement, whereby the coupling diameter becomes very considerable, increasing the mounting space requirements, the weight and the cost of the coupling. Other considerable disadvantages are the very limited maximum angle of deflection, as well as the fact that a perfect synchronism does not result for all angles of deflection.

The invention contemplates the provision of a synchronous universal coupling, free from the disadvantages of the two embodiments just discussed, permitting extremely wide deflection angles of up to 50 degrees with 100% synchronism, and combining small structural size and light weight with good efficiency and low production cost.

According to the invention, the coupling comprises anti-friction elements for torque transmission of roller shape and assembled in a cage and provided with a bore for receiving a control element for the assembled anti-friction elements in the cage. A further characteristic of the invention consists in that the roller-shaped anti-friction bodies consist of two rollers mounted on one another for relative rotation about a common axis.

DETAILED DESCRIPTION

Figure 3:
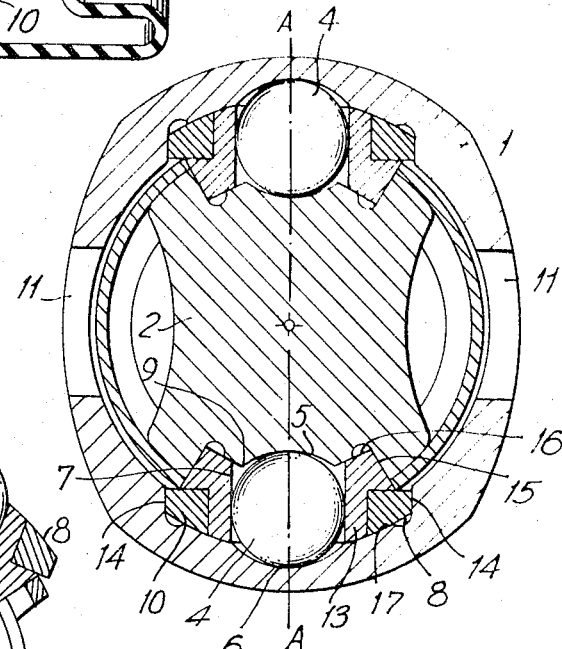
FIG. 3 is a transverse cross-section through a synchronous universal coupling according to FIG. 1.
Figure 2:
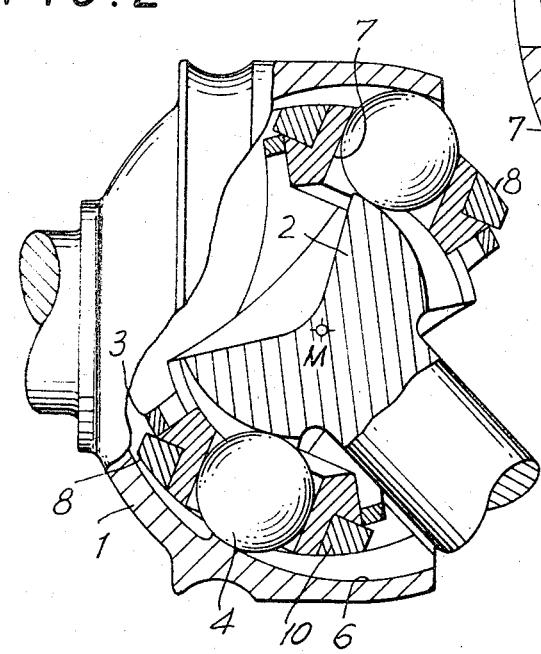
FIG. 2 is a side view partly in longitudinal section through the synchronous universal coupling according to FIG. 1, but in an angular position of the coupling members.

In the drawing there is shown a universal coupling comprising an outer coupling member 1 and an inner coupling member 2 engaged together to transmit torque therebetween while the coupling members can be pivotably moved relative to one another as shown in FIG. 2 while being turnable about an axis A—A as shown in FIG. 3.

Figure 1:
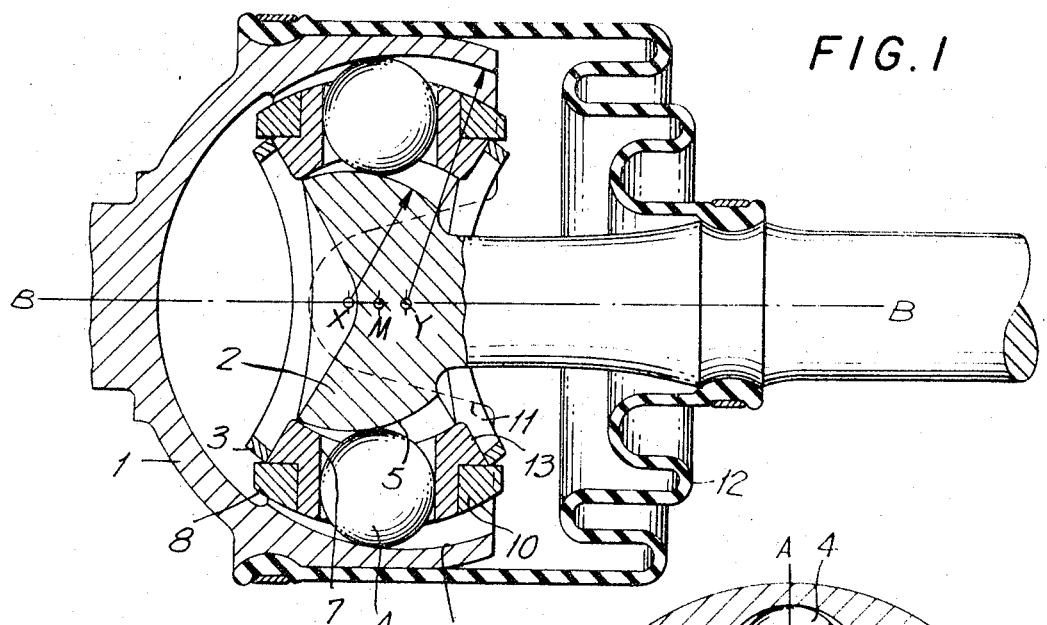
FIG. 1 is a longitudinal section through a synchronous universal coupling in straight position of the coupling members.

The outer coupling member 1 is provided with grooves 14 and the inner coupling member 2 with grooves 15 (FIG. 3) in which roller-shaped anti-friction bodies 10, 13 are lockingly engaged. The anti-friction bodies are of ring shape, body 10 being rotatably mounted on body 13. The inner anti-friction element 13 is provided with a bore 7, in which a ball shape control element 4 is supported. The element 4 cooperatively engages a curved guide groove 5 in the inner coupling member and a curved guide groove 6 in the outer coupling member in a known manner, so that the anti-friction bodies at diametrically opposed locations in the coupling will always be guided by a cage 3 to the correct positions for synchronous operation. The control grooves 5 and 6 have the curvature of an arc of a circle in the plane of axis A—A in FIG. 3 and their centers are located at X and Y respectively (FIG. 1). M is the center point for the synchronous universal coupling as a whole. The outer surface 8 of the anti-friction elements is shaped as a convex ball segment, whereas the inner surface 16 has the shape of a concave ball segment. A land 9 is formed on the grooves 15 of the inner coupling member and is shaped as a convex ball section, the center of which coincides with the center point M of the coupling. A concave surface 17 is formed in outer coupling member 1 and surface 17 has its center at M. The surfaces 8 and 16 of the anti-friction bodies have the same curvature as the surfaces 9 and 17 and are rollably engaged therewith. Consequently, the anti-friction bodies will provide universal pivotal movement of the coupling members about axes A—A and B—B.

In the outer coupling member 1 are formed recesses 11, permitting access for the chuck of the tool used for machining the curvature of the control groove 6. These recesses also facilitate assembly if the inner coupling member is detachably mounted on its universal shaft, because it permits easy access to the fastening element (not shown). A rubber cuff 12 encloses the coupling and prevents escape of the lubricant from the synchronous universal coupling.

The construction given hereinabove enables the coupling to transmit torque through the lateral abutment of the anti-friction bodies 10, 13 with the inner and outer coupling members while permitting the coupling members to freely pivot relative to one another by virtue of the rolling contact of the curved surfaces 8, 16 of the anti-friction bodies with the corresponding curved surfaces 9, 17 of the inner and outer coupling members. The ball shape elements 4 cooperate with guide grooves 5 and 6 to control the relative pivotal movement of the coupling members in the plane containing axis A—A and they also guidably support the assembly of the cage and the anti-friction bodies.

The abutment surfaces of anti-friction bodies 10, 13 with the outer and inner coupling members 1, 2, respectively, are along inclined surfaces to promote the torque transmission and the interengagement of the anti-friction bodies.

The advantage gained with the above arrangement consists particularly in making it possible to utilize control elements which are strong and most appropriately shaped for their function, without having to sacrifice much needed space for their accommodation. This is why synchronous universal couplings constructed according to the invention combine a high transmission torque value and a wide permissible angle of defletcion in a minimum mounting space. The configuration of the roller shaped anti-friction elements, as two rollers mounted, rotatably relative to each other, about a common axis coaxial with bore 7, with the outer roller engaging a groove of the outer coupling member, and the inner roller engaging a groove of the inner coupling member, avoids considerable friction and thus permits the attainment of high efficiency.

What is claimed is:

1. A universal coupling comprising inner and outer coupling members, and means joining the coupling members for transmitting torque therebetween while enabling said members to vary their relative angular positions, said means comprising a first control means in engagement with said coupling members to permit controlled universal movement therebetween and a second control means supported on the first means and also in engagement with the coupling members to transmit torque therebetween, said second control means comprising anti-friction bodies with curved inner and outer surfaces in contact with said coupling members to enable turning therebetween and lateral surfaces in abutment with said coupling members to transmit torque therebetween.

2. A coupling as claimed in claim 1, wherein said second control means comprises a cage retaining the anti-friction bodies as an assembly between the coupling members.

3. A coupling as claimed in claim 2, wherein said anti-friction bodies are provided with a bore in which said second control means is received.

4. A coupling as claimed in claim 3, wherein said anti-friction bodies comprise first and second bodies supported on one another for relative rotation about a common axis, the first body being in lateral abutment with the outer coupling member and the second body in lateral abutment with the inner coupling member, said bodies being in abutment with one another to transmit torque between said coupling members.

5. A coupling as claimed in claim 4, wherein one of said anti-friction bodies is provided with said bore and the other anti-friction body is rotatable on the said one body about an axis which is coaxial with said bore, said first control means comprising a ball seated in said bore and in rollable contact with said coupling members.

6. A coupling as claimed in claim 5, wherein said coupling members have grooved surfaces in contact with said ball which have different radii of curvature in one plane of relative angular movement of said coupling members.

7. A coupling as claimed in claim 5, wherein said anti-friction bodies are of ring shape.

8. A coupling as claimed in claim 7, wherein said first and second bodies are provided in pairs in diametrically opposed locations between said coupling members.

9. A coupling as claimed in claim 4, wherein said first and second bodies are in respective lateral abutment with the coupling members along surfaces which are inclined with respect to one another.

10. A coupling as claimed in claim 4, wherein said first anti-friction body has an outer convex surface which at least in part constitutes said curved outer surface, the latter being in contact with said outer coupling member, said second anti-friction body having an inner concave surface which at least in part constitutes said curved inner surface, the latter being in contact with said inner coupling member.

References Cited

UNITED STATES PATENTS

| | | | |
|---|---|---|---|
| 1,975,758 | 10/1934 | Stuber | 64—21 |
| 1,980,846 | 11/1934 | Bradley | 64—21 |
| 2,150,942 | 3/1939 | Rzeppa | 64—21 |
| 3,218,827 | 11/1965 | Aucktor | 64—8 |
| 3,298,201 | 1/1967 | Cadiou | 64—21 |

JAMES A. WONG, Primary Examiner